United States Patent [19]
Kuntz

[11] Patent Number: 5,626,290
[45] Date of Patent: May 6, 1997

[54] RAIN MAKING SYSTEM

[76] Inventor: W. Donald Kuntz, 1830 Park Ave., Bridgeport, Conn. 06604-2226

[21] Appl. No.: 520,068

[22] Filed: Aug. 28, 1995

[51] Int. Cl.⁶ ........................................ A01G 15/00
[52] U.S. Cl. ............................... 239/2.1; 239/14.1
[58] Field of Search ......................... 62/93; 160/34; 239/2.1, 14; 15/DIG. 2; 47/27 C

[56] References Cited

U.S. PATENT DOCUMENTS

| | | | |
|---|---|---|---|
| 3,174,688 | 3/1965 | Chatten | 239/20 |
| 3,455,509 | 7/1969 | Balkin | 239/20 X |
| 4,288,255 | 9/1981 | Burger | 15/DIG. 2 X |
| 4,741,123 | 5/1988 | Gauthier | 47/276 |
| 4,806,392 | 2/1989 | Dixon | 239/18 X |

FOREIGN PATENT DOCUMENTS

| | | | |
|---|---|---|---|
| 2758523 | 7/1978 | Germany | 47/27 C |

*Primary Examiner*—Kevin Weldon
*Attorney, Agent, or Firm*—S. Pal Asija

[57] ABSTRACT

An embodiment of this invention comprises a plurality of mono-filaments as condensation collectors. Plurality of filaments are connected to hang vertically from this horizontal cord, cable, rope on either side. A network of any size can be built. On a clear night the dew condenses on the collectors and makes rain. The condensate collector only works when there are no clouds to obstruct the heat radiation of the earth into the outer space.

9 Claims, 2 Drawing Sheets

5,626,290

1
RAIN MAKING SYSTEM

BACKGROUND

This invention relates to rain making methods, devices and system. More particularly it relates to a system of rain making by atmospheric moisture condensation.

THE PROBLEM

The problem with prior art rain making systems is that they are cumbersome and expensive. They require too many resources and are not practical in desert areas.

Following are some of the typical uses of the rain making system of this invention:

a) Watering of small backyard gardens.

b) Gardening in desert areas.

c) Collection of atmospheric moisture as water for other uses.

d) Beautification of land.

e) Gardening in unusual places eg. Roof top, Hanging pots condominiums and the like unusual places open to atmosphere.

f) Rejuvenating eroded soils with gentle rain where the top soil has been washed away by downpours.

SUMMARY

An embodiment of this invention comprises a plurality of mono-filaments as condensation collectors. In the preferred embodiment the inventor used a long horizontal cord anchored on two poles. Plurality of filaments were connected to hang vertically from this horizontal filament line on either side. The cord was high enough to clear the filaments off the ground.

PRIOR ART

A preliminary prior art search was conducted and furthermore the inventor is intimately familiar with the problem and the prior art. The following U.S. patents are typical examples of the prior art attempting to solve the problem.

These utility patents are arranged in reverse chronological order for ready reference of the reader. Furthermore the applicant reserves the right to argue relevance of these patents to applicant's invention.

a) U.S. Pat. No. 5,316,213 granted to Roy Gooderham on May 31, 1994 for "Condensate Trap"

b) U.S. Pat. No. 5,295,625 awarded to Daniel Redford on Mar. 22, 1994 for, "Microclimate Control Apparatus"

c) U.S. Pat. No. 5,261,946 bestowed upon Kenneth Overby on Nov. 16, 1993 for "Air Line Vapor Trap with Air Warming System"

d) U.S. Pat. No. 5,240,177 invented by Muramatsu et al on Aug. 31, 1993 for, "Container with Device Preventing Dew Condensation"

e) U.S. Pat. No. 5,233,843 conferred upon Norman Clarke on Aug. 10, 1993 for, "Atmospheric Moisture Collection Device"

f) U.S. Pat. No. 5,137,214 showered upon Richard Mallery on Aug. 11, 1992 for, "Method and Apparatus for Creating Artificial Rain"

Unfortunately none of the prior art devices singly or even in combination meet all of the objectives established by the inventor for this invention.

2
OBJECTIVES

1. It is an objective of this invention to provide a SIMPLE low cost universal rain making apparatus.

2. Another objective of this invention is to provide a system which can be used outdoors practically everywhere.

3. Another objective of this invention is that it can be marketed as a DIY (Do It Yourself) Kit.

4. Another objective of this invention is that it is capable of operation during night or dawn.

5. Another objective of this invention is that it may be attractively packaged for easy mailing and shipment.

6. Another objective of this invention is that it is low cost and can be readily made and easily installed.

7. Another objective of this invention is that it be easily adaptable to other uses.

·8. Another objective of this invention is that it be environmentally safe.

9. Another objective of this invention is that it be physically safe, comfortable to use and easily stored.

10. Another objective of this invention is that it be easy to use even intuitive even for novice or first time users.

11. Another objective of this invention is that it meet all federal, state, local and other private standards guidelines, regulations and recommendations with respect to safety, environment, energy consumption.

12. Another objective of this invention is that it be ergonomically designed to avoid any side ill effects on the health of the users.

13. Another objective of this invention is that it be self contained complete with instructions and space for message of the sponsor.

14. Another objective of this invention is that it requires no change in procedures, protocols and habits of the user.

15. Another objective of this invention is that it operate even when there is negligible air movement.

16. Another objective of this invention is that it can be made of any size as a network of filaments.

Other objectives of this invention reside in its simplicity, elegance of design, ease of manufacture, service and use and even aesthetics as will become apparent from the following brief description of the drawings and the detailed description of the preferred embodiment.

BRIEF DESCRIPTION OF THE DRAWING

The objects, features and advantages of the present invention and its application will be more readily appreciated when read in conjunction with the accompanying drawing, in which.

DETAILED DESCRIPTION OF THE PREFERRED EMBODIMENT

Figure 1:
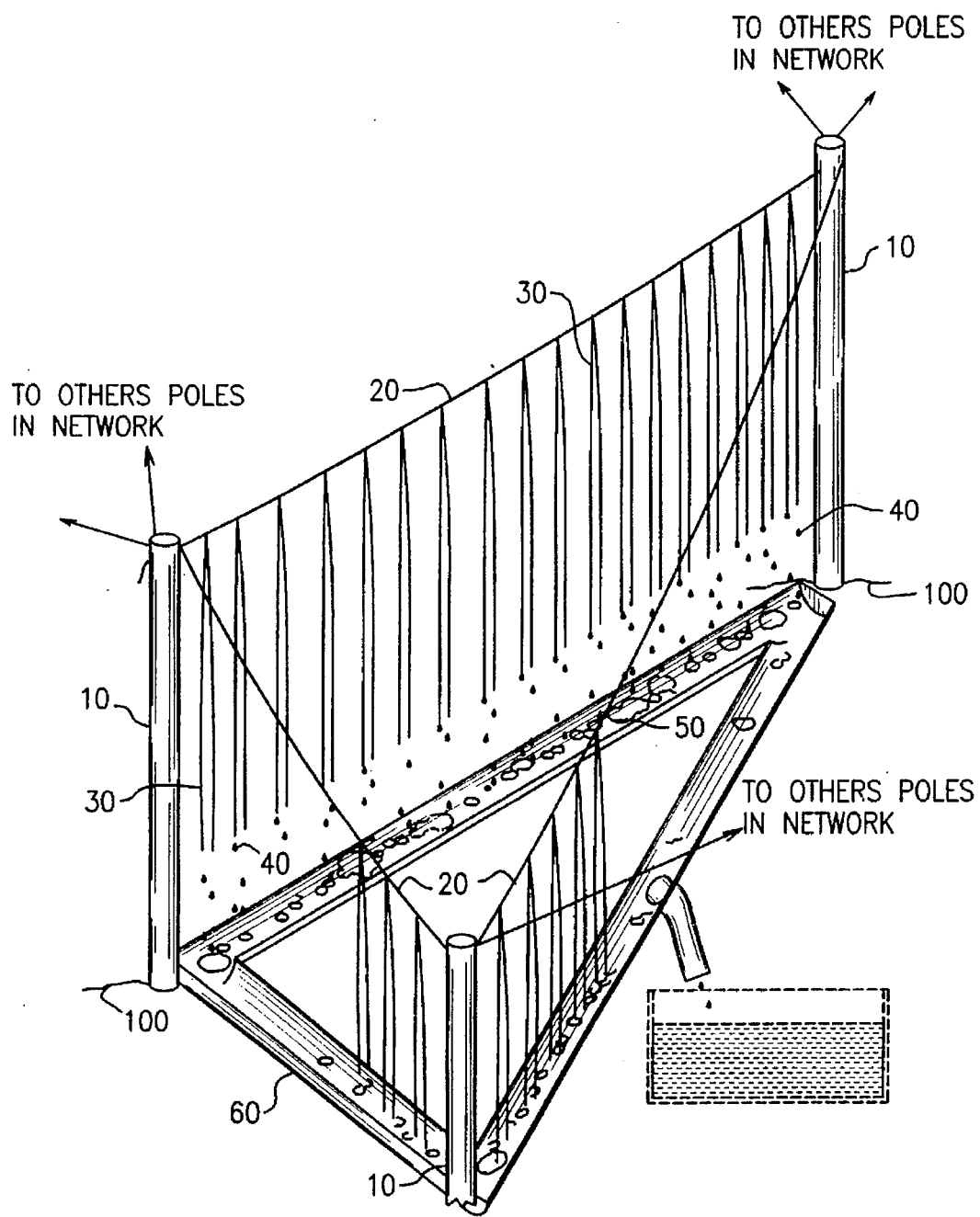
FIG. 1 is an isometric perspective view of the condensate collector rain making apparatus of this invention.
Figure 2:
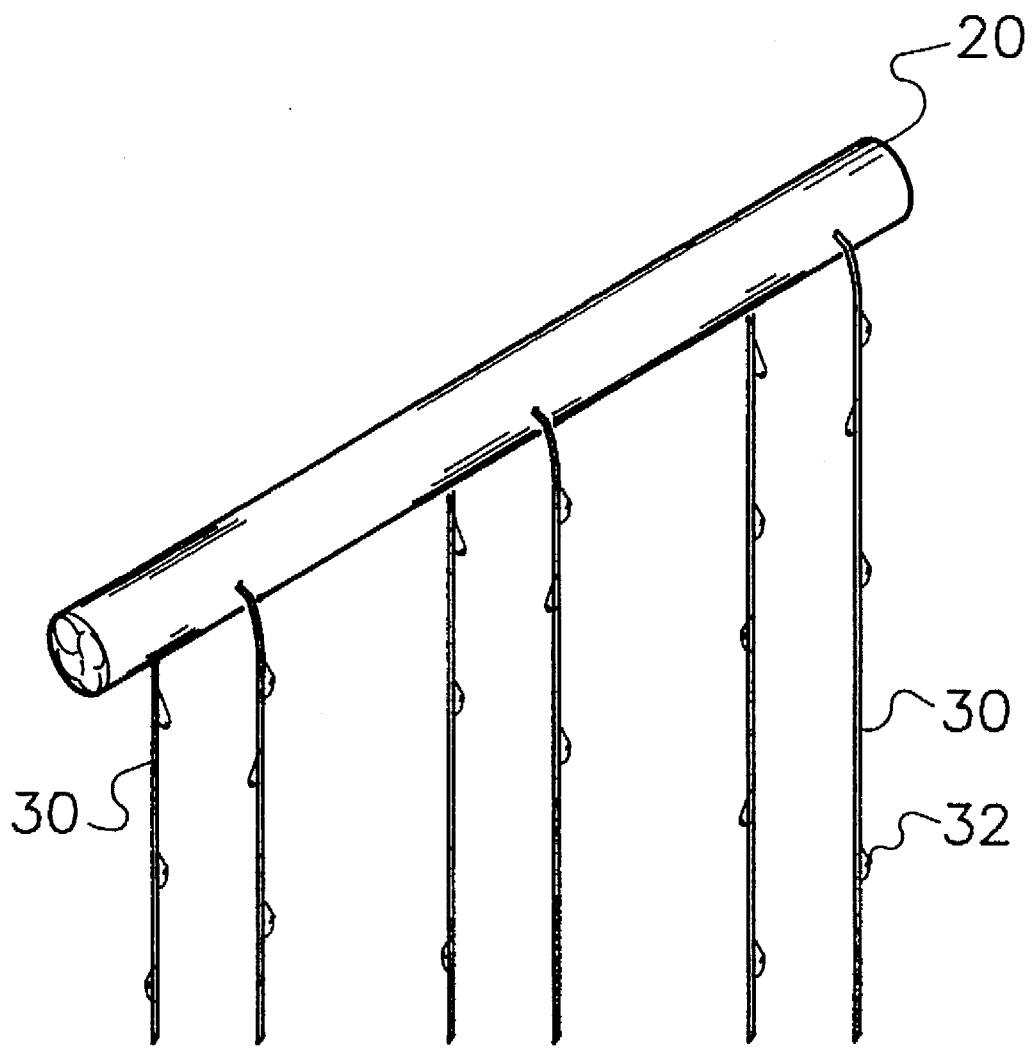
FIG. 2 is a closeup view of a small section of FIG. 1.

As shown in the drawings wherein like numerals represent like parts throughout the several views, there is generally disclosed a line, cord, rope, cable 20 anchored on a pair of poles 10. From the cord 20 hang plurality of filaments 30 on either side of said filament 20, preferably an equal length approximately one meter and only a few centimeters apart. In the preferred embodiment the inventor used monofilament made of plastic such as fishing line to shed condensate rapidly without absorbing any moisture.

The monofilament 30 may be sewn through the line 20 with or without being tied to the line. In the preferred embodiment the inventor used slip knots at each end of cord, similar to what are known as "hangman's nooses" to anchor the cord to the poles, or tree or like support members. This allows the ends of cord to be positioned quickly onto a vertical stake, pole tree or other support member and similarly can be loosened rapidly for removal. The inventor used the cord for the horizontal member because mono-filaments can be easily threaded through a cord but not through another filament.

A water channel under the entire path of the line and the filaments may be constructed so that the water can be transported to where it is needed the most.

THEORY OF OPERATION

The condensate collector only works when there are no clouds to obstruct the heat radiation of the earth into outer space. The cooling of the earth is accompanied by similar cooling of the collecting filaments 30, thus causing said collectors to act as condensate trap as attractors. The atmospheric moisture at dew point temperature forms water drops on the collectors.

The process once initiated proceeds apace as long as there is air containing moisture and the air remains warmer than the ground over which it flows. Very little air movement is required to make the collector work at removing moisture from the air.

INSTALLATION & USE

The installation and use of this invention is intuitive. A network of vertical filaments weaved or sewn through a horizontal cord is installed over the area where water is needed. Each collector element is cut off at desired length so that the dripping condensate may fall off freely.

The inventor caveats that the collecting monofilament are not to be looped or one running into another as unbroken line. Filaments are individual straight pieces. As many as necessary may be installed in a network. Similarly supporting lines may also be as long as desired. The anchoring means can be poles or other equivalent suitable anchors. Supporting lines may themselves act as condensate collectors.

The inventor further recommends that the end supports for anchors should be such that the line, as it droops in a catenary, keeps the collectors sufficiently far off the ground in the center under all reasonable disturbances such as breezes, birds perching on the line etc.

As the dew 32 begins to build up on filaments 30, it is shed immediately off the end of the mono-filaments, due to its own weight and the non-absorbency of the filaments. The falling droplets 40 fall as water 50 on the ground. This water may be used on the ground over a garden for example or it may be collected and channeled.

The inventor has given a non-limiting description of the concept. Many changes may be made to this design without deviating from the spirit of the concept of this invention. Examples of such contemplated variations include the following.

a) The invention may be combined or integrated with other complementary or related uses.

b) The shape and size of the network of filaments may be varied.

c) A different anchoring means or method may be employed.

d) A different material may be used.

e) Color, advertising, coupons and other promotional features may be added to its packaging.

f) A DIY (Do It Yourself) kit may be derived from this invention.

Other changes such as aesthetic and substitution of newer materials as they become available which substantially perform the same function in substantially the same way with substantially the same result without deviating from the spirit of this invention may be made.

DEFINITIONS

A great care has been taken to use words with their conventional dictionary definitions. Following definitions are included here for clarification.

Integrated=Combining of two entities to act like one.

Interface=Junction between two dissimilar entities.

Catenary=The curve assumed by a uniform weight line anchored on two points not necessarily in same vertical line.

DIY=Do It Yourself

DROOP=Natural sag in the line due to its own weight. (Same as catenary)

Symmetrical=The shape of an object of integrated entity which can be divided into two along some axis through the object or the integrated entity such that the two halves form mirror image of each other.

Following is a listing of the components used in this embodiment arranged in ascending order of the reference numerals for ready reference of the reader.

10=A tree or pole for anchoring line, or rope or filament

20=Longitudinal horizontal cord

30=Vertical plastic mono-filaments

32=Dew Droplets on filaments

40=Falling droplets

50=Dripping Water on ground or channel

60=channels for collecting and transporting water

100=Ground or earth

While this invention has been described with reference to illustrative embodiments, this description is not intended to be construed in a limiting sense. Various modifications and combinations of the illustrative embodiments as well as other embodiments of the invention will be apparent to persons skilled in the art upon reference to this description. It is therefore contemplated that the appended claims cover any such modifications, and/or embodiments that fall within the true scope of the invention.

The Inventor claims:

1. A rain making system comprising a network of plurality of filaments arranged outdoors and wherein said network is symmetrical and comprises a plurality of vertical filaments hanging from a plurality of horizontal cords and wherein said horizontal cords are anchored on a plurality of poles.

2. The rain making system of claim 1 further comprising a plurality of channels for collecting and transporting dew falling from said filaments.

3. A rain making system comprising a symmetrical network of plurality of filaments arranged outdoors comprising:

a) a horizontal cord;

b) anchored to a pair of support members one at each end of said horizontal cord;

c) a plurality of vertical mono-filaments hanging from said horizontal cord.

4. The rain making system of claim 3 where in said vertical filaments hang along both sides of said cord.

5. The rain making system of claim 4 where in said vertical filaments are between 1 to 2 meter long and 3–5 centimeters apart and hang along both sides of said cord in approximately equal lengths.

6. The rain making system of claim 5 further comprising a channel for collecting and transporting dew falling from said filaments.

7. The process of making rain comprising:
 a) hanging a line outdoors;
 b) hanging a plurality of plastic filaments vertically along said line; and
 c) collecting and transporting dew formed on said plastic filaments.

8. The process of making rain of claim 7 wherein further said vertical filaments are between 1 to 2 meter long and 3–5 centimeters apart and hang on either side of said line in approximately equal lengths.

9. The process of making rain of claim 7 wherein a plurality of said lines and vertical filaments are connected together into a network.

* * * * *